Sept. 28, 1954
R. C. FREVIK ET AL
2,690,109
FRAME CONSTRUCTION AND HITCH FOR FARM IMPLEMENTS
Filed May 6, 1950
2 Sheets-Sheet 2
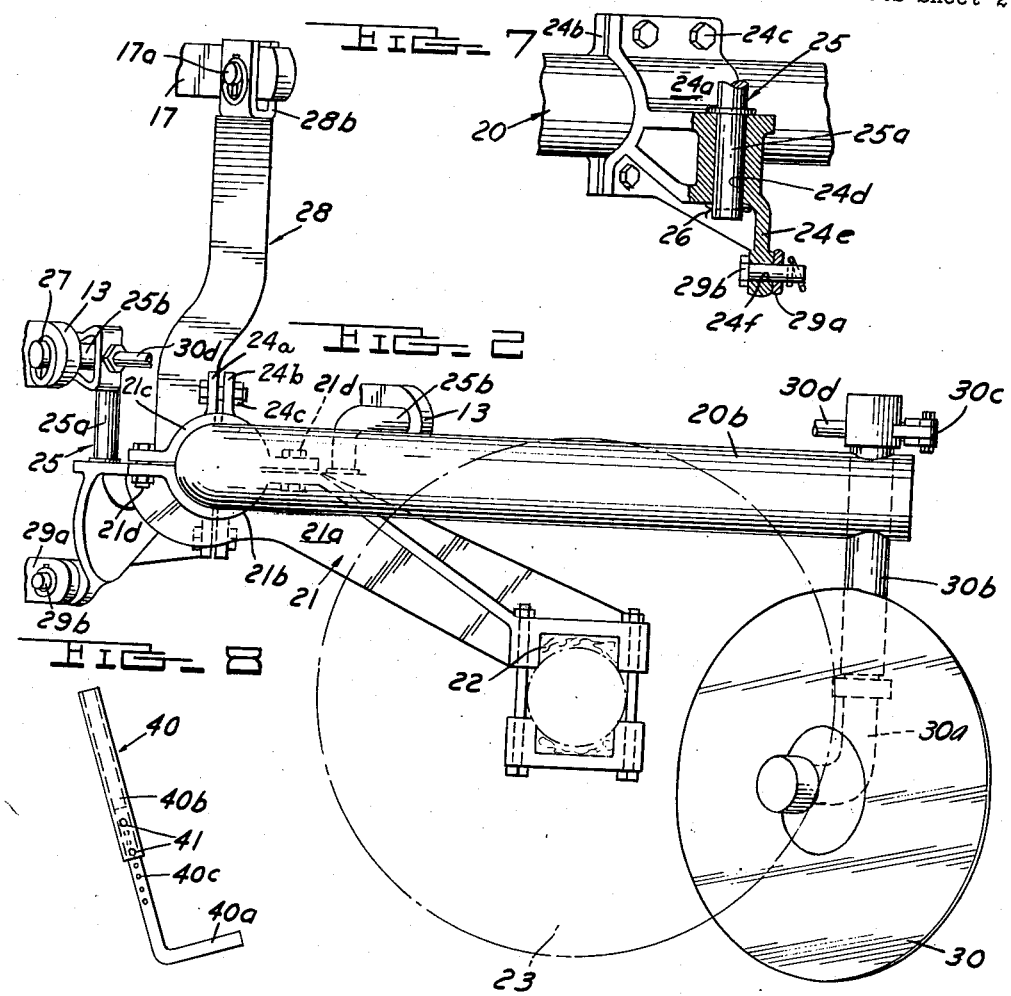
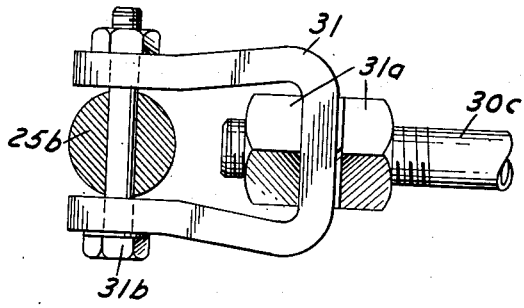
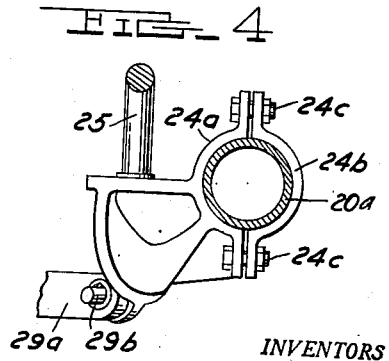
INVENTORS
RALPH C. FREVIK
BY RAYMOND W. WILSON
*W. A. Schaich*
ATTORNEY Patented Sept. 28, 1954

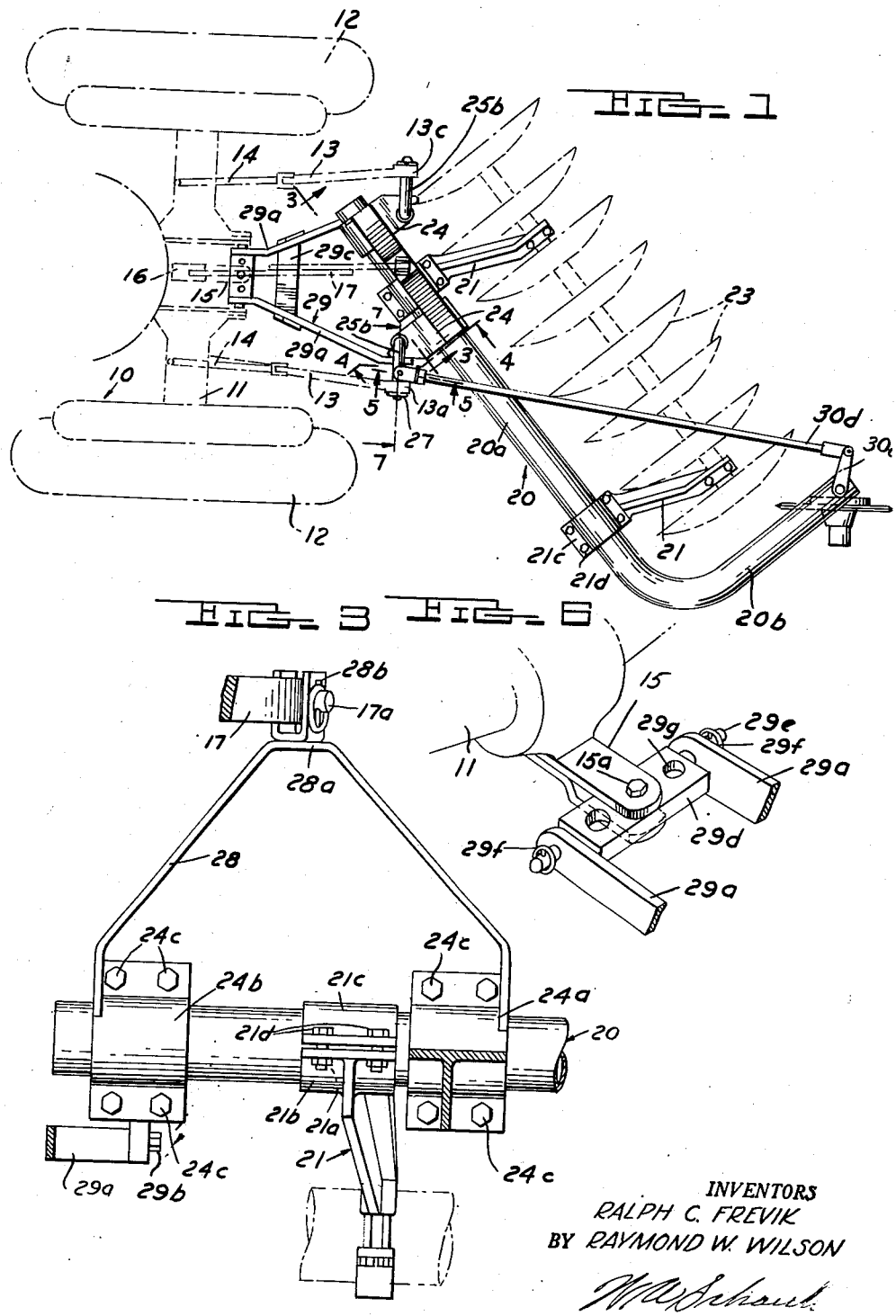

2,690,109

UNITED STATES PATENT OFFICE 2,690,109

FRAME CONSTRUCTION AND HITCH FOR FARM IMPLEMENTS

Ralph C. Frevik, Detroit, and Raymond W. Wilson, Ferndale, Mich., assignors, by mesne assignments, to Ford Motor Company, Dearborn, Mich., a corporation of Delaware Application May 6, 1950, Serial No. 160,424

8 Claims. (Cl. 97—47.53)

This invention relates to an improved frame construction and hitch for a farm implement, and particularly to an implement of the ground working type which is subject to side draft during its normal operation.

Many forms of ground working implements, particularly moldboard and disc plows, scrapers, etc., are subjected to a considerable amount of lateral pressure during their normal operation which is commonly referred to as side draft. It has been common to provide a furrow wheel or similar device on the implement to resist such side draft, but it is well recognized that a substantial amount of side draft will nevertheless be inherently transferred to the tractor drawing the implement. In the case of well known types of tractors having the so-called three point hitch linkage, embodying a pair of laterally spaced, power-lifted hitch links universally pivoted to the rear axle of the tractor and a central top link, the exertion of side draft by the implement on such hitch linkage produces serious interference with the steering and maneuverability of the tractor during the particular ground working operation. Since it has been customary to position the two transversely spaced draft links of this type of tractor in a forwardly converging relationship relative to each other when attached to an implement, it necessarily follows that the side draft exerted by an implement through such converging hitch links effectively becomes a lateral force operating on the tractor at the theoretical point of convergence of the hitch links, which is adjacent to the front end of the tractor. The effective application of a force to the tractor at this point obviously produces serious complications in the steering of the tractor and it has been heretofore necessary for the operator to keep the front wheels of the tractor slightly turned at all times in order to compensate for such side draft effects.

Another disadvantage of known types of ground working implements is the fact that they have not been designed so as to be capable of convenient conversion from a single tool implement to a multiple tool implement, as for example, a single disc plow of heretofore known types of construction could not be conveniently modified to a multiple disc plow or a disc tiller type of implement which fundamentally differs from the single disc plow only by the addition of additional ground working discs.

Accordingly, it is an object of this invention to provide an improved hitch arrangement for ground working implements subject to side draft which will effectively localize all side draft effects on the tractor at a central point on the tractor rear axle, and thereby minimize interference with the steering and maneuverability of the tractor.

A particular object of this invention is to provide an improved hitch arrangement for implements subject to side draft for use with tractors of the type having transversely spaced, power-lifted trailing hitch links, characterized by the effective concentration of all side draft effects on the tractor at the central point of the tractor rear axle without in any manner interfering with the liftability of the implement through the operation of the power-lifted hitch links.

Another object of this invention is to provide a universal frame structure for farm implements which may be employed to mount single or multiple ground working units and thereby achieve unusual manufacturing economy, as well as permitting the user of the implement to conveniently apply the number of ground working units to the frame that he desires for a particular operation.

The specific nature of this invention, as well as other objects and advantages thereof, will become apparent to those skilled in the art from the following detailed description, taken in conjunction with the attached sheets of drawings on which, by way of preferred example only, are illustrated two embodiments of this invention.

On the drawings:

Fig. 1 is a plan view of an implement frame and hitch embodying this invention shown in the specific embodiment of a one way plow or disc tiller type of implement and shown in connected relationship with a tractor.

Fig. 2 is an enlarged scale side elevational view of the implement shown in Fig. 1.

Fig. 3 is an enlarged scale partial sectional view taken on the plane 3—3 of Fig. 1.

Fig. 4 is an enlarged scale partial sectional view taken on the plane 4—4 of Fig. 1.

Fig. 5 is an enlarged scale partial sectional view taken on the plane 5—5 of Fig. 1.

Fig. 6 is an enlarged scale perspective view of the hitching arrangement provided at the front end of the tongue of the implement.

Fig. 7 is an enlarged scale sectional view taken on the plane 7—7 of Fig. 1.

Fig. 8 is a reduced scale elevational view illustrating a modified form of main frame incorporating a telescoping construction.

As shown on the drawings:

This invention will be described in connection with the type of farm implement known as a disc plow or disc tiller, but it should be distinctly understood that the features of this invention will have application to many other forms of ground engaging implements, such as cultivators, planters, etc.

Referring to Fig. 1, the numeral 10 represents the rear end portions of a well known make of tractor having a rear axle housing 11 and supporting wheels 12. At laterally spaced points on the rear axle housing 11, a pair of trailing hitch links 13 are universally pivoted thereto in such manner as to permit both vertical and horizontal movements about their pivotal mountings. The normal position of hitch links 13 is a forwardly converging relationship with a theoretical point of intersection adjacent the front axle of the tractor. As is customary, a pair of lifting arms 14 are respectively connected to medial portions of the hitch links 13 and are operated by a hydraulic mechanism (not shown) contained within the tractor to impart a lifting force to the hitch links 13. The ends of the hitch links 13 carry spherical bearing units 13a which permit the links to be universally connected to suitable hitch pins provided on an implement to which the tractor is connected. Also, at the lower central portion of the rear axle housing 11 a clevis hitch unit 15 is provided (best shown in Fig. 6), and at the top central portion of rear axle housing 11 a bracket 16 is provided which universally pivotally mounts a top hitch link 17. All of the foregoing structure is well known and further description is therefore deemed unnecessary.

In general, the implement frame construction embodying this invention constitutes a single elongated frame member, which may conveniently constitute a piece of pipe or tubing to which a plurality of tool mounting brackets are clamped at selected spaced positions therealong. In addition, a pair of hitch brackets are clamped to the main frame at the proper spacing to effect the connection of the implement to the trailing hitch links 13 of the tractor, and each hitch bracket mounts an upstanding strut, which struts define an A frame for connection to the top tractor link 17. Thus, as shown in Fig. 1, the main frame member 20 may be formed of a continuous length of tubing bent into a generally L-shaped configuration and having its long arm 20a disposed in generally transverse, angular relationship with respect to the path of travel of the implement. A plurality of tool mounting brackets 21 are provided, each of such brackets including a body portion 21a having a semi-cylindrical mounting flange 21b integrally formed thereon which cooperates with a semi-cylindrical clamp 21c to surround the tubular main frame 20 and is secured thereto in any selected position by a plurality of bolts 21d. The other end of each tool supporting bracket 21 is connected to a bearing block 22 and such bearing blocks support a gang of earth working discs 23 in conventional fashion. While the particular implement shown in the drawings employs eight discs 23, it will be obvious that any desired number of discs from one on up may be conveniently incorporated in the described construction merely by proper selection of the length of the arm portion 20a of the main frame and the spacing of the bearing brackets 21 therealong. Obviously, for units employing a much larger number of discs, additional bearing brackets 21 may be provided.

To effect the mounting of the implement to the tractor in such manner as to minimize the effect of side draft on the tractor, this invention employs a pair of hitch brackets 24 which are of identical construction, although mounted on the main tubular frame 20 in reversed relationship. Each hitch bracket 24 is a casting comprising a main body portion having a semi-cylindrically shaped flange 24a formed on one side thereof. A semi-cylindrically shaped cap 24b is provided to cooperate with each flange 24a to surround the main tubular frame 20 and to be clamped thereto at a selected location by bolts 24c. In addition, hitch bracket 24 defines a vertical pivot bearing bore 24d in which the vertical leg 25a of an inverted L-shaped hitch pin 25 is journalled for pivotal movement about a vertical axis. Hitch pin 25 may be retained in pivot bearing bore 24d by a pin 26. The horizontal arms 25b of the pivot pins 25 are respectively pivotally connected to the spherical type bearings 13a in the ends of the hitch links 13 and secured therein by linch pins 27.

As previously indicated, the bearing brackets 24 are identical, but mounted on the tubular main frame 20 with their vertical pivot bearing bores 24d respectively disposed on opposite sides of such main frame, which is readily possible due to the angular disposition of the main frame relative to the tractor. An upstanding A-frame 28, as such is popularly called in the art, is mounted on the main frame 20 in any convenient manner. For example, A-frame 28 may comprise a generally inverted U-shaped member 28a having its free end portions respectively secured as by welding to the caps 24b of the bearing brackets 24. A U-shaped connector 28b is then welded to the vertex portion of A-frame 28 and pivotally mounts the tractor top link 17 between its arm portions on a pivot pin 17a.

Each of the hitch brackets 24 are additionally provided with a depending ear 24e which defines a horizontal pivot bearing bore 24f. A generally V-shaped tongue structure 29, Fig. 1, is provided having forwardly converging side members 29a respective pivotally connected at their rear ends to the implement by pivot pins 29b inserted in the horizontal pivot bearing bores 24f. At their forward ends, the converging arms 29e are rigidly interconnected by a brace 29c and a transversely disposed hitch plate 29d is journalled in the extreme forward ends of the arms 29a for pivotal movement around a horizontal axis. For example, a pin 29e may be inserted through a suitable hole extending transversely through the hitch plate 29d and the projecting ends of such pin journalled in suitable holes provided in the ends of the arm portions 29a and retained in assembly thereon by linch pins 29f. Hitch plate 29d is provided with a plurality of transversely spaced, vertical holes 29g, each one of which may be selectively engaged by a hitch pin 15a carried by the tractor clevis hitch 15. In this manner, some adjustment of the lateral position of the tongue unit 29 with respect to the tractor may be conveniently obtained.

From the foregoing description, it will be noted that the tongue unit 29 does not interfere in any manner with the raising of the implement from the ground by lifting of the tractor hitch links 13. The horizontal pivotal connections respectively between the ends of the tongue unit 29 and the tractor and the implement permit the implement to be freely raised. Any difference in effective radius of the lifting movement of the hitch links 13 and the tongue unit 29 is accommodated by the vertical pivot bearing connection between the hitch links and the implement provided by the pivot pins 25. However, the tongue unit 29 does positively restrain any lateral movements of the implement with respect to the tractor to movements about the vertical axis defined by the hitch pin 15a. As a result, any side draft forces exerted on the implement while operating in the ground are transmitted to the tractor solely by the hitch pin 15a and hence are transmitted to the tractor at a point substantially centrally located between the tractor rear wheels. No side draft forces can be transmitted to the tractor through the hitch links 13 by virtue of the vertical pivot connections between such hitch links and the implement provided by the inverted L-shaped pivot pins 25.

It has been customary heretofore to attempt to absorb some of the side draft inherent in the operation of ground engaging implements by a coulter. An implement embodying this invention may conveniently mount a coulter 30 at the rearward end of the short arm 20b of the tubular main frame 20. The coulter 30 may be journalled in conventional fashion on the horizontal arm of an L-shaped rod 30a, the vertical arm of which in turn is journalled in a vertical sleeve 30b mounted in the end of main frame arm 20b. The vertical portion of the L-shaped rod 30a projects out of sleeve 30b and a steering arm 30c is rigidly connected thereto. A link 30d is then pivotally connected between the steering arm 30c and the horizontal arm of the nearest pivot pin 25. As best shown in Fig. 5, such pivotal connection may incorporate means for adjusting the effective length of the link 30c by utilizing a U-shaped connector 31 which has its bight portion traversed by a threaded end of the link 30c and adjustably secured thereto by a pair of nuts 31a. Bolt 31b traverses the arms of the U-shaped connector 31 and additionally passes through the horizontal arm 25b of the inverted L-shaped pivot pin 25. In this manner, any tendency of the tractor to turn relative to the implement will be accompanied by a corresponding turn of the coulter 30 in the proper direction to assist in changing the direction of the implement to conform to the new direction of tractor travel.

As previously indicated, the frame construction of this invention may be utilized with implements employing either one or a plurality of ground working tools 23. The flexibility of the described frame construction may be further increased by employing the modified construction shown in reduced scale in Fig. 8, wherein the main frame 40 employs a telescoping arrangement. Such modified main frame 40 may include an L-shaped tubular piece 40a which is telescopingly received by a straight tubular piece 40b. The effective length of the modified frame 40 may then be conveniently adjusted by varying the extent of insertion of the L-shaped member 40a into the straight tubular member 40b. Suitable transverse holes 40c are provided, spaced along the length of such tubular members, to receive bolts 41 to retain the two frame pieces in any selected position of relative insertion.

It is therefore apparent that this invention provides an unusually simple, rugged, economically manufacturable frame construction and hitch for ground engaging, lift type implements which may be employed for a large range of sizes of a particular ground engaging implement. Furthermore, the described hitch arrangement minimizes the adverse effects of side draft upon the steering of the tractor to which the implement is connected without in any manner interfering with the liftability of the implement.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having a central, rear, hitch point and a pair of transversely spaced, power-lifted hitch links universally pivoted to the tractor in trailing relationship, a hitch for lift type implements subject to side draft when operating, comprising a forwardly projecting tongue structure pivoted to the implement for movement only about a horizontal axis, means on the forward end of said tongue structure for universal pivotal connection to the central rear hitch point of the tractor, a pair of hitch elements respectively pivotally connected to the implement at laterally spaced points for movement in a horizontal plane, each of said hitch elements having a horizontally disposed pivot pin portion oscillatable about a vertical axis only and adapted for respective connection to the tractor hitch links, whereby the implement-tongue structure connection accommodates lifting of the implement by said hitch links but side draft is transmitted to the tractor only through said tongue structure.

2. The combination defined in claim 1 wherein the means on the forward end of said tongue structure includes a transversely extending bar having a plurality of transversely spaced apertures therein adapted for selective connection to the central, rear, hitch point of the tractor.

3. For use with a tractor having a central, rear, hitch point and a pair of transversely spaced, power-lifted hitch links universally pivoted to the tractor in trailing relationship, an implement subject to side draft and having a rigid frame, a forwardly projecting tongue structure pivoted to said implement frame for swinging movement about a horizontal axis only, means on the forward end of said tongue structure for universal pivotal connection to the central, rear, hitch point of the tractor, a pair of hitch elements respectively pivotally connected to the implement frame at laterally spaced points for movement in a horizontal plane, each of said hitch elements having horizontally disposed pivot pin portions adapted for pivotal connection to the tractor hitch links, whereby said hitch links are effective to lift said implement but are ineffective to steer said implement, so that implement side draft is transmitted to the tractor only through said tongue structure.

4. For use with a tractor having a central, rear, hitch point and a pair of transversely spaced, power-lifted hitch links universally pivoted to the tractor in trailing relationship, an implement subject to side draft and having a rigid frame, said rigid frame including a transversely extending structural member, a pair of brackets secured to said structural member at transversely spaced points, each of said brackets defining a vertical axis pivotal bearing, a pair of L-shaped hitch elements having vertical portions respectively pivotally journalled in said vertical axis pivot bearings and horizontal portions respectively adapted for pivotal connection to the tractor hitch links, a forwardly projecting tongue structure pivoted to said brackets on a horizontal axis only, and means on the forward end of said tongue structure for universal pivotal connection to the central rear hitch point of the tractor, whereby the implement is liftable by said hitch links, but transmits side draft to the tractor only through said tongue structure.

5. For use with a tractor having central, rear hitch point and a pair of transversely spaced, power-lifted hitch links universally pivoted to the tractor in trailing relationship, an implement subject to side draft and having a rigid frame, said rigid frame including a transversely extending structural member, a pair of brackets secured to said structural member at transversely spaced points, each of said brackets defining a vertical axis pivotal bearing, a pair of L-shaped hitch elements having vertical portions respectively pivotally journalled in said vertical axis pivot bearings and horizontal portions respectively adapted for pivotal connection to the tractor hitch links, means on each of said brackets defining a horizontal axis pivot bearing and a tongue structure having a pair of forwardly converging arms respectively pivotally connected to said horizontal pivot bearings at their rear ends, and means at the front ends of said converging arms adapted for universal pivotal connection to the central, rear, hitch point of the tractor.

6. The combination defined in claim 5 wherein the last mentioned means includes a transversely extending bar having a plurality of transversely spaced apertures therein adapted for selective connection to the central, rear, hitch point of the tractor.

7. The combination defined in claim 3 plus a coulter mounted in depending relationship to said rigid frame for pivotal movement about a vertical axis, and link means connecting said coulter to one of said horizontally disposed pivot pin portions, thereby controlling the angular position of said coulter relative to said frame as a function of the angular position of said one horizontally disposed pivot pin portion relative to the implement frame.

8. For use with a tractor having a centrally located rear hitch point and transversely spaced trailing draft links universally pivotally connected to the tractor, a ground-engaging implement subject to side draft and having a rigid frame, laterally extending transversely spaced pivot arms on said frame adapted for connection to said draft links and freely swingable about a vertical axis, a forwardly projecting tongue structure pivoted to said frame for movement only in a vertical plane, means for pivotally connecting the forward extremity of said tongue structure to said rear hitch point for both lateral and vertical movement, means on said frame defining an additional vertical pivot axis, a coulter carried by said frame for movement about said additional axis, and means steerably connecting said coulter to one of said pivot arms, whereby said implement transmits draft to the tractor only through said tongue structure and said pivot arms are pivotal about their vertical axes by virtue of their connections to said hitch links to steer said coulter about said additional vertical axis.

References Cited in the file of this patent

UNITED STATES PATENTS

| Number | Name | Date |
|---|---|---|
| 1,916,945 | Ferguson | July 4, 1933 |
| 1,996,676 | Hargrave | Apr. 2, 1935 |
| 2,041,216 | Sjogren et al. | May 19, 1936 |
| 2,118,181 | Ferguson | May 24, 1938 |
| 2,174,310 | Tuft et al. | Sept. 26, 1939 |
| 2,320,141 | Kott | May 25, 1943 |
| 2,420,530 | Evans | May 13, 1947 |
| 2,430,732 | Orelind et al. | Nov. 11, 1947 |
| 2,518,215 | Wright | Aug. 8, 1950 |
| 2,534,761 | Englund | Dec. 19, 1950 |